Oct. 7, 1969  K. C. HELLWIG ET AL  3,471,580
PRODUCTION OF GLYCEROL FROM SACCHARIDES
Original Filed Nov. 30, 1964
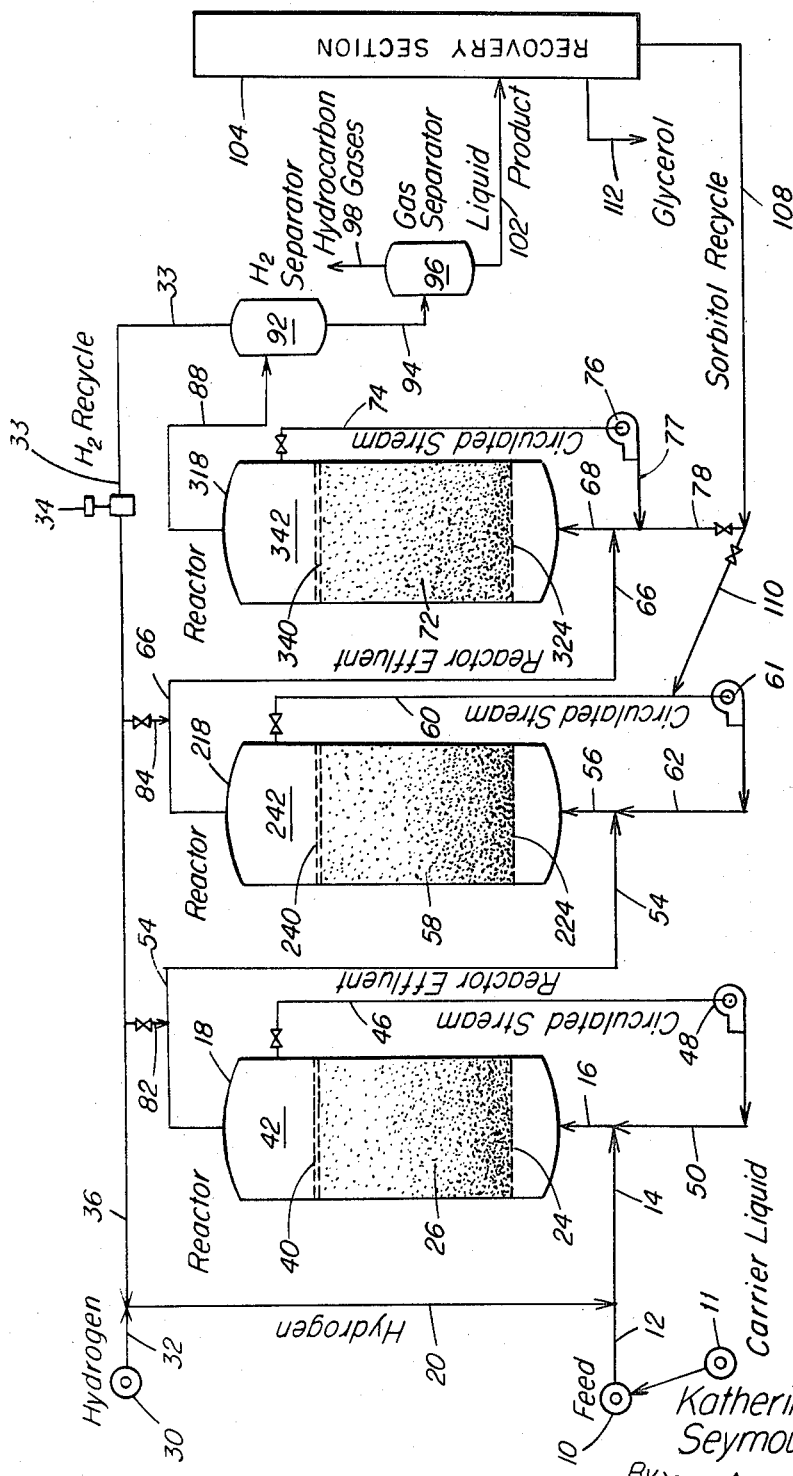
Inventors
Katherine C. Hellwig
Seymour C. Schuman
By Nathaniel Ely
Attorney

United States Patent Office 3,471,580
Patented Oct. 7, 1969

3,471,580
PRODUCTION OF GLYCEROL FROM
SACCHARIDES
Katherine C. Hellwig, Trenton, and Seymour C. Schuman, Princeton, N.J., assignors to Hydrocarbon Research, Inc., New York, N.Y., a corporation of New Jersey
Continuation of application Ser. No. 414,543, Nov. 30, 1964. This application Apr. 19, 1968, Ser. No. 722,804
Int. Cl. C07c 31/18
U.S. Cl. 260—635                                                9 Claims

ABSTRACT OF THE DISCLOSURE

A multi-stage process for the catalytic conversion of a saccharide feed wherein the feed, with hydrogen and in admixture with water and a carrier liquid is passed firstly, upwardly through a first reaction zone containing an ebullated catalytic bed composed of a dual function catalyst at high temperatures and pressures, and then removing the liquid products from the first stage and passing these products upwardly with hydrogen through at least one catalytic hydrogenation zone at high temperatures and pressures and wherein the catalyst is a single function hydrogenation catalyst and then removing the final glycerol product from the last of the reaction zones.

---

This application is a continuation of application Ser. No. 414,543 filed Nov. 30, 1964 and now abandoned.

This invention relates to the conversion of saccharides having at least one glucose unit, and especially starch to glycerol. Particularly, the invention relates to a combination hydrolysis-hydrogenation process for the conversion of starch to glycerol.

Glycerol is produced commercially as a by-product of fat splitting for fatty acids or synthetically by the epichlorohydrin route or the allyl alcohol-hydrogen peroxide route. The synthetic routes involve complicated paths.

Starch is converted to glucose commercially by acid hydrolysis. Sorbitol is produced commercially by catalytic hydrogenation of glucose. Sorbitol has been split by hydrogenation to form glycerol and also propylene glycol.

Starch is difficult to work with because of its insolubility in organic liquids and the gelatinous nature of aqueous systems containing even relatively small amounts of starch. This is conducive to batch operations. Temperature control is of critical importance and this has been difficult to obtain in the literature studies of starch hydrogenation. Also glucose tends to revert in the reactor to a dimeric form, thereby lowering yield.

An object of the invention is the hydrogen conversion of saccharides having at least one glucose unit—preferably polysaccharides—to glycerol.

Another object of the invention is a process for simultaneous hydrolysis and hydrogenation of polysaccharides—especially starch—to sorbitol and to glycerol (and propylene glycol) in high yield.

Other specific objects of the invention will become apparent in the course of the description thereof.

The single figure shows in schematic layout a preferred embodiment for the conversion of corn starch, principally to glycerol.

Broadly, glycerol is obtained in the process of the invention by treating a saccharide feed having at least one glucose unit, in admixture with a liquid carrier, at a temperature of about 200°–550° F., with free-hydrogen at a hydrogen partial pressure of about 700–3500 p.s.i.a.; by passing the feed, carrier and hydrogen upwardly through a body of solid particulate hydrogenation catalyst, this body being in an expanded, ebullated state. The yield of glycerol is improved by having water—preferably as the carrier liquid—in the treating zone.

A multi-stage treating operation is beneficial particularly with polysaccharide feeds such as starch.

In the figure a saccharide feed having at least one glucose unit from source 10 and a carrier liquid from source 11 are intermingled and passed by way of lines 12, 14 and 16 in the bottom of reactor 18. In this embodiment the feed is corn starch.

The carrier liquid is preferably water. Organic liquids which do not interfere with the hydrogenation (and hydrolysis) reaction may be used. In some cases an organic liquid may be the carrier but water is also present in order to have the hydrolysis reaction which leads to sorbitol production. The saccharide feed is commonly dispersed as solid particles in the carrier liquid. With water carrier, the saccharide may be in the form of a dispersion; in the case of starch a gelatinous mixture; or a solution. The process is applicable to any of these normally difficult to handle saccharide-carrier liquid admixtures.

The organic liquid carrier is desirably a hydrocarbon or one of the common solvents including combined oxygen, such as alkanols, ethers and ketones. The alkanols and the paraffin hydrocarbons are preferred organic carrier liquids. Illustrative are ethanol, butanol, hexanol, hexane, octane, light naphtha, etc.

Hydrogen gas from line 20 is introduced into line 14 and enters reactor 18 along with feed and carrier liquid—corn starch and water—below the lower level, formed by distributor plate 24, of catalyst body 26.

The hydrogen gas may be pure, or may contain appreciable amounts of diluents such as methane, ethane, nitrogen etc. Since the conversion reaction is in part controlled by hydrogen partial pressure, it is desirable to keep the diluent gas content of the hydrogen stream as low as practical in order to decrease the pressure requirements in reactor 18. Here outside make-up hydrogen from source 30 is passed by line 32 to line 20; recycle hydrogen from line 33, compressor 34 and line 36 is passed into line 20.

Sufficient hydrogen is charged to provide the amount needed to obtain the desired degree of conversion. The amount of hydrogen, and other conditions, are controlled to hold to a minimum the conversion of polyol materials to hydrocarbons, such as propane, ethane and methane.

The lower limit of the catalyst body 26 in reactor 18 is determined by distributor 24. Herein this is shown as a perforated plate or grid of conventional type. Distributor 24 may be any of the types used to permit introduction of a liquid-gas feed below a body of catalyst.

A body of solid particulate catalyst 26 is maintained in reactor 18. Body 26 is during operation of the process in an ebullated state (also spoken of as an ebullated bed). The use of an ebullated bed of solid particles in gas-liquid contacting is described in detail in Johanson U.S. Patent No. 2,987,465, granted June 6, 1961. Briefly in an ebullated bed the solid particles are expanded to occupy a greater volume of space than in their settled state; they are in random motion as a result of the action of the upflowing stream of liquid and gas; and the bed is characterized by a well-defined upper level of solid particles, i.e. there is essentially no carryover of solid particles by the liquid withdrawn from the upper porton of the reactor.

An ebullated bed of solid particulate catalyst is present in reactor 18; it is desirable that the ebullated bed have an expanded volume at least about 10% greater than the settled state volume of the body. Generally the expansion is about 10–100% greater than the settled state volume. The upper level of the ebullated bed in reactor 18 is shown by the double-dashed line 40.

The size of the catalyst particles will be determined by the type of catalyst, the conditions of operation in reactor 18, and by the degree of bed expansion desired. For an ebullated bed the particles may range from onehalf inch downward. Catalyst having sieve sizes of about 200 mesh have been used successfully. A particularly suitable particle size is afforded by commercial catalyst which is available as cylinders: one-tenth inch diameter by one-quarter inch long; one-sixteenth inch diameter by one-quarter inch long.

The process of the invention utilizes a solid particulate hydrogenation catalyst. Anyone of those known for the hydrogenaiton of organic materials may be used.

It must be understood that the type of catalyst used is in part determined by the operation of reactor 18. In a straight forward hydrogenation the saccharide is converted to methyl pentitol which in turn is converted to equal amounts of glycerol and propylene glycol; a side reaction tends to produce pentitol and methane. When the hydrogenation is carried out in the presence of water, simultaneous hydrolysis and hydrogenation reactions tend to produce sorbitol which in turn is hydrogenated to produce essentially only glycerol. If desired conditions may be controlled to produce a mixture of glycerol and propylene glycol.

When glycerol yield is the desired object of the process, the hydrogen treatment is carried out in the presence of water so as to direct the product to sorbitol. In this operation, the catalyst must have not only hydrogenation effectiveness but also hydrolytic effectiveness. The so-called acidic hydrogenation catalysts are effective for this purpose.

Illustrative single function hydrogenation catalysts are nickel on kieselguhr and copper chromite. An illustrative dual function hydrogenation-hydrolysis catalyst is cobalt on silica-alumina, which catalyst is present in reactor 18 as body 26 in this embodiment. It is to be understood not all of these catalysts are equal and operating conditions will have to be adjusted to obtain optimum results with each catalyst—within the hereinafter defined operating conditions.

The upwardly flowing carrier in reactor 18 is in the liquid state and sufficient pressure is maintained in reactor 18 to keep the carrier essentially entirely in the liquid state at the particular temperature of operation.

It is desirable to have substantially an isothermal reaction zone. This is accomplished in part by the ebullated bed and in part by operating with recycle of carrier liquid and associated reaction product and starch. A stream is withdrawn from an upper portion 42 of the reactor 18 above the ebullated bed 26 and circulated to the lower portion of the reactor below the catalyst bed 26 by way of valved line 46, pump 48, line 50 and line 16. This circulating stream need not be external to the reactor 18; it may be an internal circulation through a conduit extending from below the catalyst bed to a point within zone 42; the internal circulation may be gravity flow or it may be assisted by an internal pump. The volume of stream circulated is dependent on the particular feed, catalyst and operating conditions and may vary from essentially zero to 20 or more volumes per volume of liquid charged.

The upflowing liquid is passed through the catalyst bed at the rate needed to obtain the desired conversion at the particular set of operating conditions. Broadly, the space velocity in the reactor 18 for starch feed is between about 0.1 and 10 and commonly is about 0.5–2.0. Herein "space velocity" is defined as the volume of carrier liquid in line 14, charged per volume of catalyst in the settled state per hour.

In a multistage operation the first reaction zone is operated to maximize conversion to sorbitol or methyl pentitol; the second reaction zone (and other further reaction zones) are operated to maximize conversion to glycerol or beyond toward proylene glycol. Some glycerol will be produced in the first reaction zone.

Broadly, a saccharide feed is treated with hydrogen in the first reaction zone—here reactor 18—at a temperature between about 200° F. and 400° F., and a hydrogen partial pressure of between about 700 and 3500 p.s.i.a. A preferred condition for starch treatment with both hydrogen and water is about 300°–350° F. and hydrogen partial pressure of about 1500–2500 p.s.i.a.

A stream of carrier liquid and associated reaction products including here sorbitol and glycerol (and some slight amount of starch) is withdrawn from upper portion 42 of reactor 18 and passed by way of lines 54 and 56 into the lower portion of reactor 218 below distributor plate 224.

A solid particulate catalyst body 58 is positioned in reactor 218 above distributor 224. In reactor 18 the feed stream is a dispersion of solid saccharide in a liquid carrier or a gelatinous viscous admixture of starch in water carrier, which stream is difficulty handable in any catalyst body other than an ebullated bed. Catalyst coating by the feed is automatically overcome by the self-cleaning action of the ebullated bed. The reactions in the first zone convert the feed to materials which are appreciably soluble in the preferred carrier liquids and the effluent stream leaving reactor 18 by way of line 54 is essentially a homogeneous solution stream.

The effluent stream in line 54 can be processed satisfactorily with a ebullated bed, fixed bed or other contacting means. The ability of the ebullated bed to retain the catalyst particle within the reactor and thereby essentially eliminating catalyst carryover into downstream vessels makes this the preferred catalyst body for all the treating zones.

Another advantage of the ebullated bed lies in the ability to withdraw catalyst from the reactor and add fresh or regenerated catalyst thereto while the operation is on stream, thereby maintaining more-or-less constant catalyst activity and consequent uniformity of product distribution over the length of the run. Such withdrawal and addition means, and also the regeneration means, are not shown because this is now a conventional feature of ebullated bed operation.

The catalyst used in the second reaction zone may be the same type as used in the first zone. However, when a dual-function catalyst is used in the first zone, it is desirable to use a single function hydrogenation catalyst in the second zone, such as nickel on kieselguhr. Reaction conditions will be controlled for the particular catalyst to break the sorbitol so as to produce glycerol as the favored product.

Broadly in the second reaction zone the reaction products from reactor 18 are treated with hydrogen at a temperature between about 300° F. and 550° F. at a hydrogen partial pressure of between about 1000 and 3500 p.s.i.a. A preferred condition for sorbitol treatment in water carrier is about 350°–400° F. and a hydrogen partial pressure of about 1500–2500 p.s.i.a.

The space velocity in any reactor will be that best suited for the operating variables and the feed. Generally this will fall within the range set forth earlier.

A circulating stream is taken from upper portion 242 above the ebullated bed upper limit indicated by 240 and passed by way of valved line 60, pump 61 and lines 62 and 56 into the bottom of reactor 218.

A stream of carrier liquid and associated reaction products including glycerol, sorbitol and propylene glycol is passed from reactor 218 by way of lines 66 and 68 into the lower portion of reactor 318 below distributor 324.

In this embodiment reactor 318 contains an ebullated body 72 of solid catalyst particles having a well defined upper level 340. All remarks made with respect to catalyst body 58 are applicable to catalyst body 72. Here reactor 318 is operated as a sorbitol follow-up reactor and is operated under the same conditions as those set forth earlier for reactor 218. When the sorbitol content of the effluent from reactor 318 is desired to be a minimum, reactor 318 is run as a third reaction zone at conditions of temperature, hydrogen and space velocity somewhat more severe than those of the second zone.

Like the other reactors 18 and 218, reactor 318 is provided with external circulation by way of valved line 74, pump 76, line 77, valved line 78 and line 68.

All the hydrogen can be added in reactor 18 or additional hydrogen may be added to each reactor 218 and 318 as by way of recycle line 33, compressor 34 and valved lines 82 and 84 respectively.

Side reactions occur to produce hydrocarbons, particularly gaseous hydrocarbons, lower boiling alkanols such as methanol and ethanol; and similar compounds. The carrier liquid and associated reaction products, principally glycerol, are passed from reactor 318 by way of line 88 to hydrogen separator 92.

Hydrogen gas and some non-condensible gases are removed in separator 92 and passed by line 33 as hydrogen recycle to the reactors. The product stream is passed from separator 92 by way of line 94 to gas separator 96 where hydrocarbon gases such as methane, ethane and propane are separated overhead and sent to disposal by line 98.

The liquid product stream is passed by way of line 102 to recovery section 104. In section 104, the product stream is split into its major components namely, carrier liquid which may be recycled; sorbitol which is shown as being recycled by way of line 108 or lines 108 and 110; glycerol shown being withdrawn by way of line 112. Commonly a substantial amount of propylene glycol will be produced; also some methanol, ethanol and isopropanol.

In a specific embodiment of the process of the invention corn starch containing mostly amylose polymer, 25%, and a liquid water carrier 75%, are treated in reactor 18 at a temperature of about 325° F. at a hydrogen partial pressure of about 1700 p.s.i.a. using an ebullated bed, having a 50% expansion, made of cobalt on silica-alumina pills, at a space velocity of about 1. The holding time in reactor 18 converts the starch to soluble products (and some gas). The water and reaction product solution is passed to reactor 218 where these are treated at about 375° F. and a hydrogen partial pressure of about 1700 p.s.i.a. using an ebullated bed, having a 50% expansion, made up of nickel on alumina pills, at a space velocity of about 1.2. The water and reaction products from reactor 218 are passed to reactor 318 where the ebullated bed is the same type as in reactor 218; other conditions are temperature 390° F., hydrogen partial pressure 1700 p.s.i.a. and space velocity 1.2. Under these conditions the corn starch is converted, on a weight basis, roughly to glycerol 50%; propylene glycol, 20%; methanol, ethanol and isopropanol, 20%; other and loss 10%.

While the process has been described as a multistage operation, the process may be carried out in a single reaction zone, although at the expense of once through yield and product separation ease. The saccharide feed in admixture with a liquid carrier is treated with hydrogen and water if desired, at a temperature between about 200° F. and about 550 F. at a hydrogen partial pressure between about 700 and 3500 p.s.i.a. The feed stream is passed upwardly through an ebullated body of catalyst (described hereinbefore) and a stream of carrier and associated feed and product withdrawn from the reaction zone. In the case of a starch and water carrier feed stream, it is preferred to operate at a temperature of between about 300°–400° F. at a hydrogen partial pressure of about 1500–2500 p.s.i.a. Space velocities may be the same as those in the multistage operation.

Although the embodiment of the figure has been described in terms of corn starch feed, the process is applicable to any saccharide having at least one glucose unit. Thus glucose itself may be converted to methyl pentitol or sorbitol and then to glycerol and propylene glycol. By-products of sugar refining such as black strap molasses and syrups are suitable feeds to the process. The process is of particular interest to the polysaccharides such as starch, cellulose and glycogen. The feed includes materials which are rich in polysaccharides, especially in starch, such as corn meal and flour.

Thus having described the invention, what is claimed is:

1. A process for the production of glycerol from a saccharide feed which comprises:
    (a) passing the feed with water in admixture and a liquid carrier selected from the class consisting of water, lower alkanols and paraffins, together with hydrogen upwardly through a first reaction zone containing a particulate catalytic bed composed of a dual-function hydrogenation catalyst consisting of cobalt on silica alumina at such velocity to cause the bed to become ebullated and wherein the hydrogen partial pressure is within the range from about 700 to about 3500 p.s.i.a., the temperature is within the range from about 200° F. to about 400° F. and the space velocity is within the range from about 0.1 to 10.0 $V_f/hr./V_r$;
    (b) removing a reaction product solution and water from the first reaction zone;
    (c) passing the reaction product solution and water from the first reaction zone upwardly with hydrogen through at least one subsequent reaction zone connected in series with the first reaction zone and with each other wherein each of the subsequent reaction zones contain a particulate catalytic bed composed of a single-function, non-acidic hydrogenation catalyst selected from the class consisting of nickel on kieselguhr, copper chromite and nickel on alumina, at such velocity to cause the beds to become ebullated and wherein the hydrogen partial pressure is within the range from about 1000 to about 3500 p.s.i.a. and the temperature is within the range from about 300° F. to about 550° F.;
    (d) passing the reaction product solution and water from each subsequent reaction zone to the next subsequent reaction zone and;
    (e) removing the product mixture from the last subsequent reaction zone.

2. The process as claimed in claim 1 wherein the feed is a polysaccharide.

3. The process as claimed in claim 2 wherein the polysaccharide is starch.

4. The process as claimed in claim 2 wherein the polysaccharide is cellulose.

5. The process as claimed in claim 2 wherein the polysaccharide is molasses.

6. The process as claimed in claim 2 wherein the polysaccharide is glucose.

7. The process as claimed in claim 1 wherein the carrier liquid is water.

8. A process for the production of glycerol from a saccharide feed which comprises:
    (a) passing the feed in admixture with water together with hydrogen upwardly through a first reaction zone containing a particulate catalytic bed composed of a dual-function catalyst consisting of cobalt on silica-alumina at such velocity to cause the bed to be become ebullated and at hydrogen partial pressures of about 1700 p.s.i.a. and temperatures of about 325° F. and a space velocity of about 1.0 $V_f/hr./V_r$;
    (b) removing a reaction product solution and water from the first reaction zone;
    (c) passing the reaction product solution and water from the first reaction zone together with hydrogen upwardly through a second reaction zone containing a particulate catalytic bed composed of a catalyst selected from the class consisting of nickel on kieselguhr, copper chromite and nickel on alumina, at such velocity to cause the bed to become ebullated and at hydrogen partial pressure of about 1700 p.s.i.a. and temperatures of about 375° F. and space velocity of about 1.2 $V_f$/hr./$V_r$ and;

(d) removing water and reaction products from the second reaction zone.

9. The process as claimed in claim 6 which further includes passing the water and reaction products from the second reaction zone together with hydrogen upwardly through a third reaction zone containing a particulate catalytic bed composed of a catalyst selected from the class consisting of nickel on kieselguhr, copper chromite and nickel on alumina, at such velocity to cause the bed to become ebullated and at hydrogen partial pressures of about 1700 p.s.i.a. and temperatures of about 390° F. and space velocity of about 1.2 $V_f$/hr./$V_r$ and removing the water and reaction products from the third reaction zone.

References Cited

UNITED STATES PATENTS

| Re. 25,770 | 4/1965 | Johanson. |
|---|---|---|
| 2,290,439 | 7/1942 | Lenth et al. |
| 2,335,731 | 11/1943 | Bottoms. |
| 2,609,399 | 9/1952 | Kool et al. |
| 2,642,462 | 6/1953 | Kasehagen. |
| 2,852,570 | 9/1958 | Conradin et al. |
| 2,965,679 | 12/1960 | Conradin et al. |
| 2,968,680 | 1/1961 | Kasehagen. |
| 3,030,429 | 4/1962 | Conradin et al. |

FOREIGN PATENTS

| 625,171 | 6/1949 | Great Britain. |
|---|---|---|

LEON ZITVER, Primary Examiner

J. E. EVANS, Assistant Examiner

U.S. Cl. X.R.

260—638